United States Patent
Benantar et al.

(10) Patent No.: US 8,468,607 B2
(45) Date of Patent: Jun. 18, 2013

(54) ASSOCIATING MULTIPLE SECURITY DOMAINS TO APPLICATION SERVERS

(75) Inventors: Messaoud Benantar, Austin, TX (US); Patrick M. Commarford, Louisville, KY (US); Ajay R. Karkala, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 712 days.

(21) Appl. No.: 12/574,825

(22) Filed: Oct. 7, 2009

(65) Prior Publication Data

US 2011/0083164 A1 Apr. 7, 2011

(51) Int. Cl.
*G06F 21/00* (2006.01)
(52) U.S. Cl.
USPC ............... 726/26; 726/27; 713/165; 713/167
(58) Field of Classification Search
USPC .................................................. 713/165–167
See application file for complete search history.

(56) References Cited

U.S. PATENT DOCUMENTS

| | | | | |
|---|---|---|---|---|
| 6,292,900 | B1 * | 9/2001 | Ngo et al. ........................ | 726/6 |
| 7,549,165 | B2 * | 6/2009 | Focke et al. ..................... | 726/22 |
| 2001/0047485 | A1 * | 11/2001 | Brown et al. .................... | 713/201 |
| 2005/0091355 | A1 * | 4/2005 | Keohane et al. ................. | 709/223 |
| 2006/0161990 | A1 * | 7/2006 | Frey et al. ........................ | 726/26 |
| 2009/0254993 | A1 * | 10/2009 | Leone .............................. | 726/25 |

OTHER PUBLICATIONS

Balabine, Igor et al., "Deploying Multi-tier Applications Across Multiple Security Domains", *Certification and Security in E-Services* vol. 255 of IFIP Conference Proceedings, Kluwer, Enrico Nardelli; Sabina Posadziejewski & Maurizio Talamo, (ed.) 2002 , pp. 177-179 and 181.

Hawblitzel, Chris et al., "Implementing Multiple Protection Domains in Java", In Proceedings of the 1998 Usenix Annual Technical Conference Jun. 1998 , 1-12.

Stoneburner, Gary et al., "Engineering Principles for Information Technology Security (A Baseline for Achieving Security)", NIST Special Publication 800-27 Revision A http://csrc.nist.gov/publications/nistpubs/800-27A/SP800-27-RevA.pdf (Obtained from Internet on May 4, 2009) Jun. 2004 , 1-35.

* cited by examiner

*Primary Examiner* — Benjamin Lanier
(74) *Attorney, Agent, or Firm* — DeLizio Gilliam, PLLC

(57) ABSTRACT

Multiple security domains can be created and associated with various scopes within the cell allowing security configurations of each scope to be managed collectively. Examples of scopes include the entire cell, one or more application servers, one or more applications, one or more clusters, one or more service integration buses, one or more nodes, etc. Security configurations associated with the security domains can be applied to the scopes based on a hierarchy of the security domains. In addition, new security domains may be created automatically based on security requirements of newly installed applications.

17 Claims, 5 Drawing Sheets

ASSOCIATING MULTIPLE SECURITY DOMAINS TO APPLICATION SERVERS

BACKGROUND

Embodiments of the inventive subject matter generally relate to the field of application server security, and, more particularly, to associating multi-security domains to application servers.

Websphere® application servers are usually statically bound to a single security domain that is defined through a configuration procedure. The security domain corresponds to a set of security attributes that define the security behavior of the server at runtime. Static association to a single security domain disregards the variety of security environments in which applications may be deployed. For example, an application for accessing financial account information should be run in an environment with a higher level of security than an application that can be accessed anonymously. Deploying these different applications on the same application server that is statically bound to one security domain may be impractical.

SUMMARY

Embodiments include a computer implemented method directed to traversing a representation of a hierarchy of security domains until locating a first element of the representation that indicates the code resource. If the first element is associated with a scope of a first of the security domains that encompasses a group of code resources that include the code resource, a security configuration associated with the first element of the representation can be determined. The security configuration can be applied to the code resource.

Embodiments include a computer program product comprising a computer usable medium having computer usable program code. In some embodiments, the computer useable program code can be configured to traverse a representation of a hierarchy of security domains until locating a first element of the representation that indicates the code resource. If the first element is associated with a scope of a first of the security domains that encompasses a group of code resources that include the code resource, a security configuration associated with the first element of the representation can be determined. The security configuration can be applied to the code resource.

Embodiments include a computer program product comprising a computer usable medium having computer usable program code. In some embodiments, the computer useable program code can be configured to detect installation of an application on an application server. In some embodiments, security attributes of the application can be determined. A plurality of security domains associated with the application server can be determined. If the security attributes are not met by security configurations associated with the plurality of security domains, a first security domain can be created based on the security attributes. If a first of the plurality of security domains takes precedence over the first security domain, the application server can be dissociated from the first of the plurality of security domains. A security domain can be created. The application server can be associated with the new security domain in the security domain map.

Embodiments include an apparatus comprising one or more processing units, a network interface and a security domain unit. In some embodiments, the security domain unit is operable to traverse a representation of a hierarchy of security domains until locating a first element of the representation that indicates the code resource. If the first element is associated with a scope of a first of the security domains that encompasses a group of code resources that include the code resource, a security configuration associated with the first element of the representation can be determined. The security configuration can be applied to the code resource.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to Websphere application servers, embodiments may be implemented in other types of application servers, such as a WebLogic® server, a JOnAS application server, etc. In other instances, well-known instruction instances, protocols, structures, and techniques have not been shown in detail in order not to obfuscate the description.

A cell represents a logical and physical grouping of application servers that share a common management entity. A security domain is associated with the cell ("cell level security domain") so that a security configuration of the cell level security domain is applied to all of the application servers in the cell. A group of the application servers may be running an application that requires a different security configuration than is indicated by the cell level security domain. A new security configuration can be created to override the cell level security configuration for an individual application server, but the new security configuration is not associated with other application servers in the group. So, security configurations to support the application are managed individually for each application server in the group. Multiple security domains can be created and associated with various scopes within the cell allowing security configurations of each scope to be managed collectively. Examples of scopes include the entire cell, one or more application servers, one or more applications, one or more clusters, one or more service integration buses, one or more nodes, etc. Security configurations associated with the security domains can be applied to the scopes based on a hierarchy of the security domains. In addition, new security domains may be created automatically based on security requirements of newly installed applications.

Figure 1:
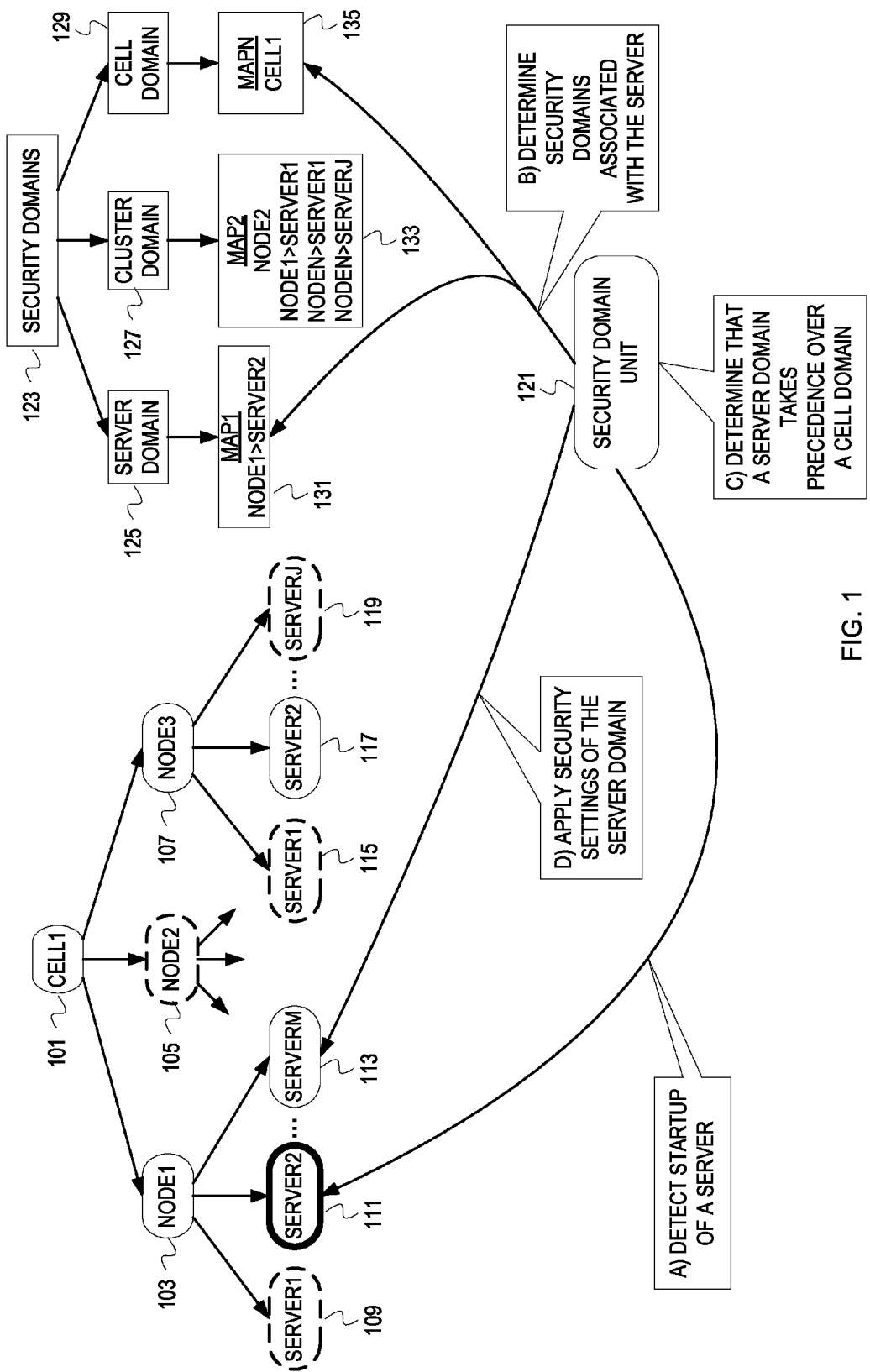
FIG. 1 is an example conceptual diagram of applying security to an application server based on a hierarchy of security domains.

FIG. 1 is an example conceptual diagram of applying security to an application server based on a hierarchy of security domains. A cell 101 comprises node1 103, node2 105, and node3 107. Cells can be a logical and/or physical grouping of application servers that share common management entities. In this example, the security domain unit 121 is the management entity for cell1 101. Node1 103 comprises three application servers, server1 109, server2 111, and server m 113. Node3 comprises server1 115, server2 117, and server j 119. Although not shown, node1 103, node2 105, and node3 107 may contain additional application servers.

A security domain comprises a security configuration and an indication of a logical and/or physical grouping of code resources to which the security configuration should be applied. The logical and/or physical grouping of code resources subject to the security configuration of the security domain is the scope of the security domain. Examples of scopes include cells, one or more application servers, one or more applications, one or more clusters, one or more service integration buses, one or more nodes, etc. Examples of code resources include servlets, modules, applications, etc. In addition, a code resource can be deployed on one or more application servers. In this example, a representation of a security domains hierarchy 123 comprises a security domain with a server scope ("server level security domain") 125, a security domain with a cluster scope ("cluster level security domain") 127, and a security domain with a cell scope ("cell level security domain") security domain 129. Although not shown, the security domains hierarchy 123 may comprise additional security domains. For example, the security domains hierarchy 123 may comprise an additional server level security domain, and a security domain associated with an application ("application level security domain"). The server level security domain 125, cluster level security domain 127, and cell level security domain 129 can comprise respective security configurations.

A security configuration comprises one or more security settings that can be applied to application servers. Server level security domains can be associated with one or more individual application servers. Cluster level security domains can be associated with clusters of application servers in cells. Clusters can represent logical groupings of application servers that are similar in terms of configuration and functionality. For example, a cluster may comprise a group of web servers. Clusters may comprise application servers and nodes. Cell level security domains can be associated with each application server that belongs to a cell.

The server level security domain 125, cluster level security domain 127, and cell level security domain 129 can also comprise map1 131, map2 133, and mapn 135, respectively. Map 1 131, map2 133, and mapn 135 represent security domain maps that indicate the application servers that are within the scope of the respective security domains. In this example, map1 indicates that server2 111 of node 1 is associated with the server level security domain 125. Map2 127 indicates that servers in node2 105, server1 113 of node 1 103, server1 115 and serverj 119 of node3 107 are associated with the cluster level domain 127. Mapn 135 indicates that servers in cell 101 are associated with the cell level security domain 129. The configuration files and the domain maps can be stored as Extensible Markup Language (XML) files. The security domains hierarchy 123 can be represented by a file structure. For example, the security domains hierarchy 123 is represented by a top level folder called "security domains," while the server level security domain 125, the cluster level security domain 127, and the cell level security domain 128 are represented by folders called "server domain," "cluster domain," and "cell domain," respectively. The "security domains" folder contains the "server domain," "cluster domain," and "cell domain" folders. The "server domain," "cluster domain," and "cell domain" folders each contain a configuration file and a domain map.

At stage A, the security domain unit 121 detects startup of the server2 111. For example, the security domain unit 121 receives a request from server2 111 for a security configuration.

At stage B, the security domain unit 121 determines security domains associated with the server2 111. The security domain unit 121 determines the security domains associated with the server2 111 based on the map1 131, map2 133, and mapn 135. In this example, map1 131 indicates that the server level security domain 125 is associated with server2 111. Mapn 135 indicates that the cell level security domain 129 is associated with server2 111 because server2 belongs to cell1 101.

At stage C, the security domain unit 121 determines that the server level security domain 125 takes precedence over the cell level security domain 129. Security domains can be applied to application servers based on a precedence of the security domains' scopes. In this example, the scopes are cluster, server, and cell. So, the security domains are applied based on a precedence of cluster level, server level, then cell level. So, if an application server is not associated with a cluster level security domain and/or a server level security domain, the cell level security domain is applied to the application server. Although multiple security domains can be associated with an application server, a single security domain may be applied the application server at one time. Associating application servers in a cell with multiple domains allows customization of security settings and collective management of the custom security settings over various scopes.

At stage D, the security domain unit 121 applies security settings of the server level security domain 125 to the server2 111. Security settings may comprise Java® Authentication and Authorization Service (JAAS) login modules, quality of service for Internet Inter-Object Request Broker Protocol (IIOP), authentication token mechanisms, encryption schemes, etc. For example, the security domain unit 121 applies the security settings of the server level security domain 125 to the server2 111 based on a configuration file in a "server domain" folder. Additionally, security settings for a specific security attribute can be applied to an application server based on a cell level security domain if a cluster level or server level security domain associated with the server does not define the specific security attribute. Other cell settings such as application installations, administrative options, etc. are applied to application servers regardless of the application servers' security domain associations.

Although examples refer to application servers being associated with security domains, embodiments are not so limited. Security domains can be associated with any group of code resources. For example, security domain 1 has a scope of cluster and the cluster comprises application 1, module 2, and application server 3. Security domain 2 has a scope of application 1. For application 1, security domain 2 has precedence over security domain 1, so security domain 2's security configuration is applied to application 1. Security domain 1's security configuration is applied to module 2, and application server 3.

Figure 2:
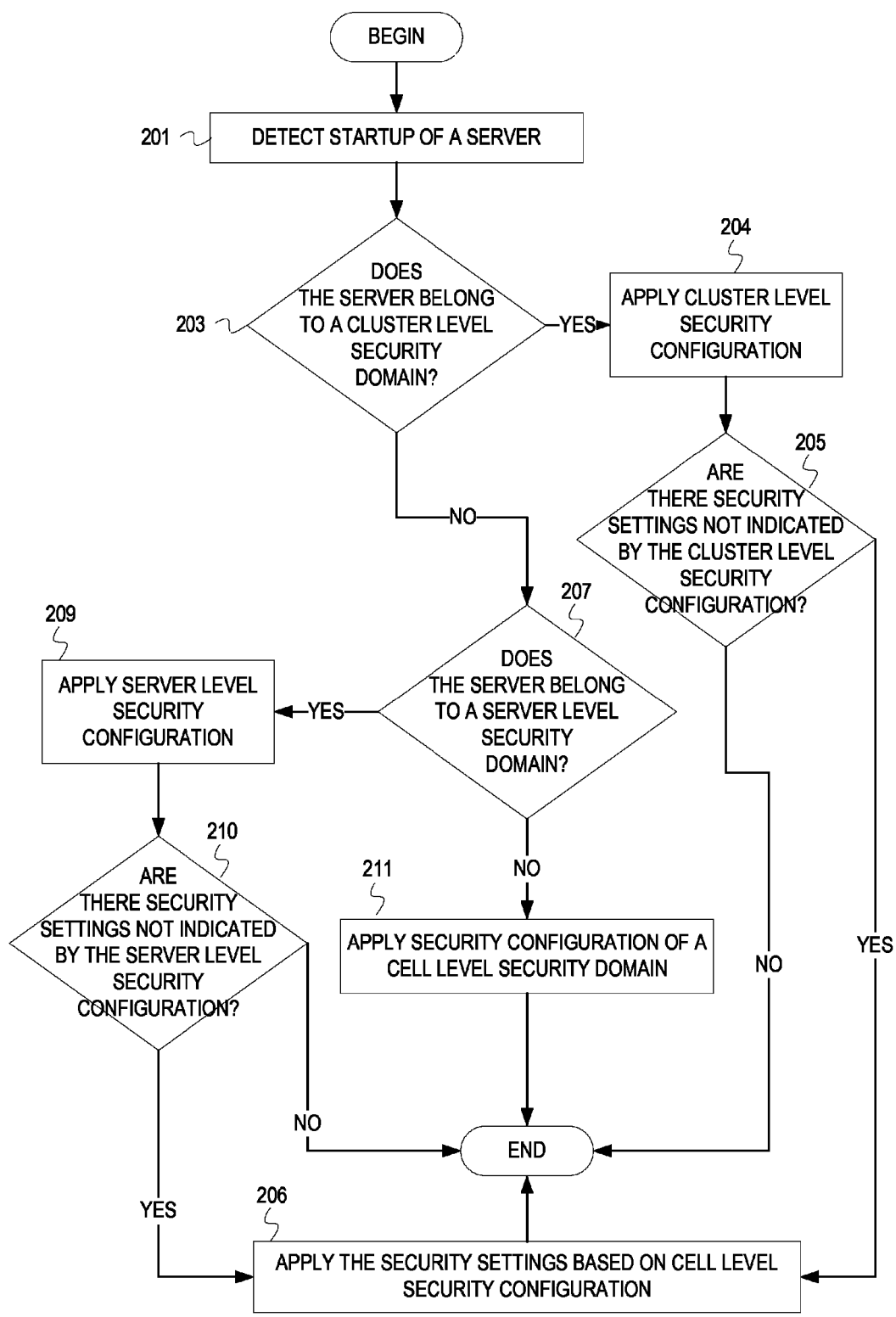
FIG. 2 depicts a flowchart of example operations for applying security to an application server based on a hierarchy of security domains.

FIG. 2 depicts a flowchart of example operations for applying security to an application server based on a hierarchy of security domains. Startup of a server is detected (block 201). For example, a security domain unit detects a discovery request from a server.

It is determined if the server belongs to a cluster level security domain (block 203). Cluster level security domains can be associated with a group of application servers that have similar functionality. The determination can be based on a domain map associated with the cluster level security domain. For example, a security domain unit determines that two cluster level security domains exist in a "security domains" folder. The security domain unit navigates to a folder for each cluster level domain. The security domain unit determines if the server is indicated in one of the map files stored in cluster level domain folders.

If the server belongs to the cluster level security domain, security settings indicated in a cluster level security configuration are applied to the server (block 204).

It is determined if there are security settings not indicated by the cluster level security configuration (block 205). For example, an application installed on an application server indicates four security attributes. The cluster level security configuration can be used to apply security settings that satisfy two of the security attributes, so there are two security attributes that cannot be satisfied by the cluster level security configuration.

If there are security settings not indicated by the cluster level security configuration, the security settings are applied based on a cell level security configuration (block 206).

If the server does not belong to the cluster level security domain, it is determined if the server belongs to a server level security domain (block 207). For example, a security domain unit determines if server_domain_map.xml file indicates that the server level security domain is associated with the server.

If the server belongs to the server level security domain, security settings indicated in a server level security configuration are applied to the server (block 209). For example, the security settings of the server level security domain are specified in a server_domain.xml configuration file. Server level security domains can be associated with one or more individual application servers.

It is determined if there are security settings not indicated by the server level security configuration (block 210).

If there are security settings not indicated by the server level security configuration, the security settings are applied based on a cell level security configuration (block 206). In addition, security settings that are not indicated by a cluster level security domain can be applied based on the server level security configuration if the application server is associated with the server level security domain.

If the server does not belong to the cluster level security domain or the server level security domain, security settings indicated in the security configuration are of a cell level security domain are applied to the server (block 211). Applying cell level security settings can be a default condition because all application servers within a cell are associated with the cell level security domain.

Although FIG. 2 refers to a hierarchy based on server, cluster, and cell scopes, embodiments are not so limited. For example, a second hierarchy may be based on application, cluster, node, and cell scopes. In addition, security domains may be associated with one or more different scopes. For example, a security domain is associated with both an application server and an individual application. As another example, a security domain's scope encompasses two applets, and two applications on three application servers. A security configuration of the security domain can be individually applied to the two applets and two applications when the two applets and two applications are initialized.

Although examples refer to applying security domains to application servers at startup, embodiments are not so limited. For example, an application server may perform a refresh to update its security domain rather than restarting. The application server can be unavailable for a shorter amount of time due to a refresh than the application server would be for a restart.

Figure 3:
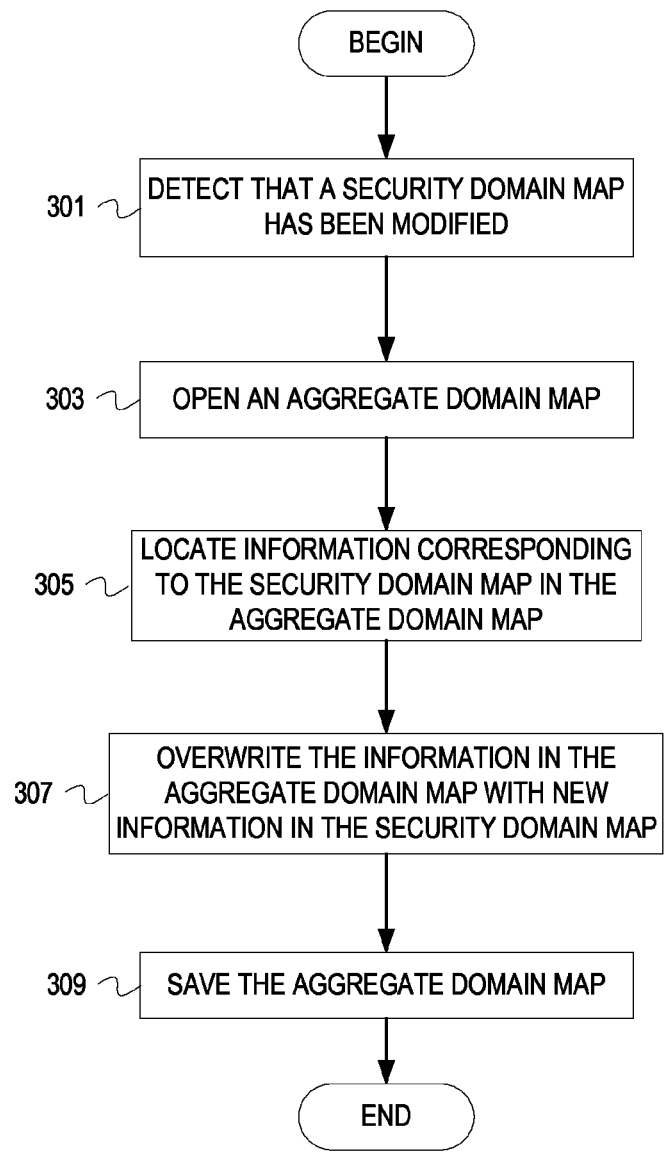
FIG. 3 depicts a flowchart of example operations for automatically updating an aggregate domain map.

Domain maps indicate application servers that are associated with certain security domains. However, the domain maps may be stored at the bottom of a file structure hierarchy. Browsing to the bottom of the file structure hierarchy for a large cell with many different security domains may be time consuming. An aggregate domain map comprising domain maps for each security domain in a cell can be created and stored in the top level of the file structure. The aggregate domain map can be a representation of a security domain hierarchy. For example, an aggregate domain map comprises a tree representation of a security domain hierarchy represented by nested XML tags. FIG. 3 depicts a flowchart of example operations for automatically updating an aggregate domain map. Modification of a security domain map is detected (block 301). For example, a security domain unit detects that the security domain map has been saved.

An aggregate domain map at the top of s security domain hierarchy is opened (block 303).

Information corresponding to the security domain map is located in the aggregate domain map (block 305). For example, the aggregate domain map and the security domain map are represented by XML files. The information corresponding to the security domain map in the aggregate domain map is indicated by a domain name XML tag in the aggregate domain map.

The information corresponding to the security domain map is overwritten with new information in the security domain map (block 307). The new information may comprise the entire security domain map or a portion of the security domain map that was modified. For example, the information in the aggregate domain map corresponding to the security domain map exists between domain name XML tags. The information between the domain name XML tags is overwritten with information in the security domain map.

The aggregate domain map is saved (block 309).

Figure 4:
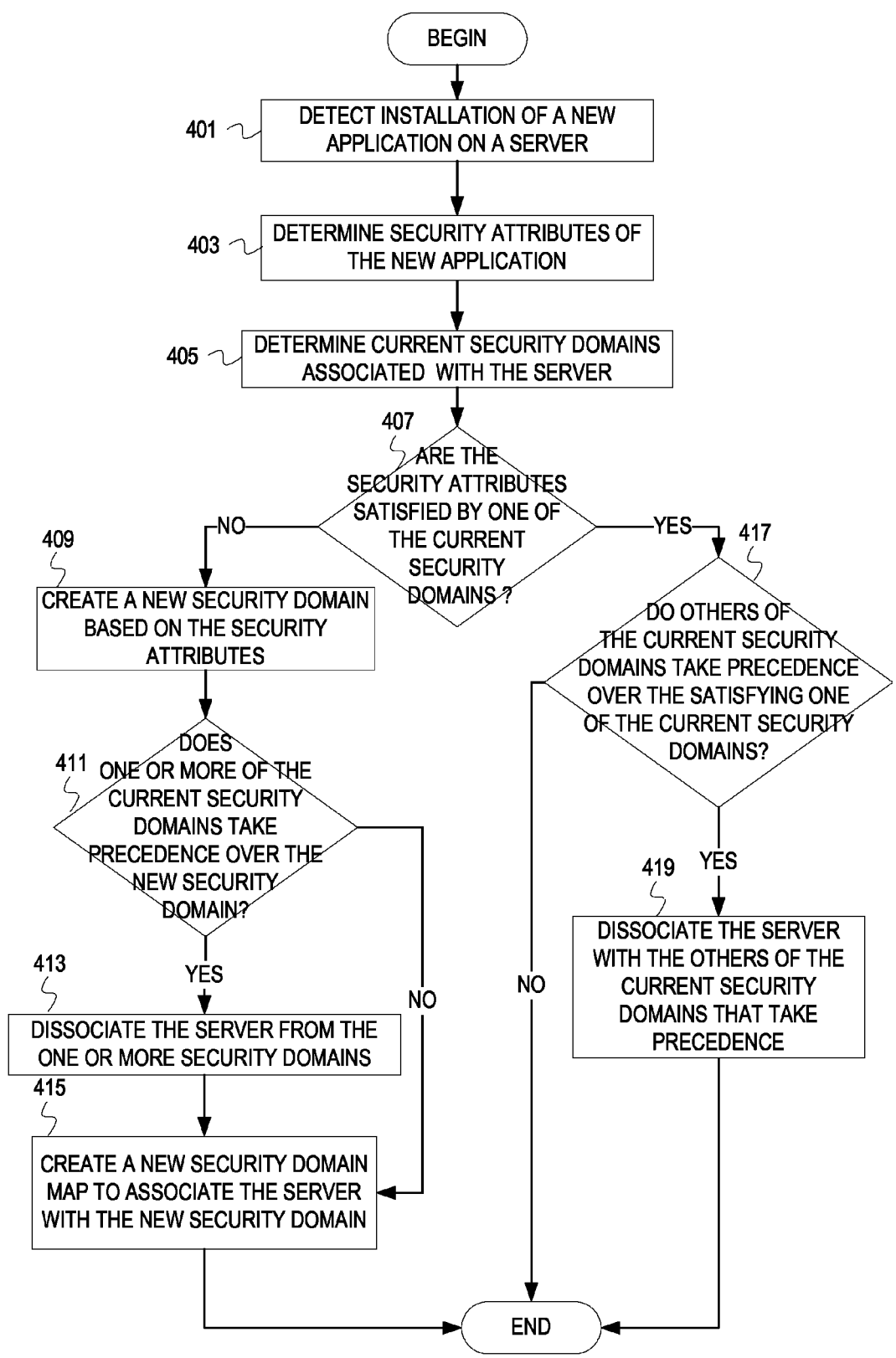
FIG. 4 depicts a flowchart of example operations for automatically creating a security domain.

Security domains may be created manually by a cell administrator. For example, the cell administrator defines a cluster level domain when the cell administrator deploys a distributed application on a group of application servers. Security domains may also be created automatically. FIG. 4 depicts a flowchart of example operations for automatically creating a security domain. Installation of a new application on a server is detected (block 401).

Security attributes of the new application are determined (block 403). For example, the security attributes are determined from an attributes file in the application installation package. The security attributes indicate values for each security setting that should be applied for the application to run. For example, the security attributes of an application may indicate 128 bit Advanced Encryption Standard encryption.

Current security domains associated with the server are determined (block 405). For example, a server domain unit examines an aggregate domain map to determine the security domains that are associated with the server.

It is determined if the security attributes are satisfied by one of the current security domains associated with the server (block 407). Determining if the security attributes are met by one of the current security domains comprises comparing the security attributes with security settings indicated in security configuration corresponding to each current security domain.

If the security attributes are not satisfied by one of the current security domains, a new security domain is created based on the security attributes (block 409). For example, an XML file is created to indicate the security attributes. Before creating the new security domain, other security domains not associated with the server may be examined to determine if one of the other security domains meets the security attributes. If the security attributes are met by a first of the other security domains, the server is dissociated from any current security domains with that may have precedence over the first security domain. The server is then associated with the first security domain.

It is determined if the one or more of the current security domains takes precedence over the new security domain (block 411). For example, it is determined if a cluster level security domain map indicates the server and takes precedence over the new security domain.

If one or more of the current security domains takes precedence over the new security domain, the server is dissociated from the one or more current security domains (block 413). Dissociating the server from the one or more current security domains may comprise removing the server from scopes of the one or more current security domains. For example, a cluster level domain takes precedence over the new security domain, so a member XML tag that indicates the server is removed from a cluster_security_map.xml file.

If one or more of the current security domains does not take precedence over the new security domain, a new security domain map is created to associate the server with the new security domain (block 415) and flow ends. Associating the server with the new security domain can comprise defining a scope of the security domain. In this example, the server represents the scope of the new security domain. In other examples, the application, one or more modules within the application, etc. could represent the scope of the new security domain.

If the security attributes are satisfied by one of the current security domains, it is determined if others of the current security domains take precedence over the satisfying one of the current security domains (block 417). For example, if the security attributes are met by a current cell level security domain, the cell level security domain cannot be applied to the server until the server is dissociated from any current cluster level and/or current server level security domains because the cluster level and server level security domains take precedence over the current cell level domain.

If others of the current security domains take precedence over the current security domain that satisfies the security attributes, the server is dissociated from the others of the current security domains (block 419) and flow ends.

It should be understood that the depicted flowcharts are examples meant to aid in understanding embodiments and should not be used to limit embodiments or limit scope of the claims. Embodiments may perform additional operations, fewer operations, operations in a different order, operations in parallel, and some operations differently. Referring to FIGS. 4, the operation for determining the security attributes of the new application and determining current security domains associated with the server may be interchanged.

Embodiments may take the form of an entirely hardware embodiment, a software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 5:
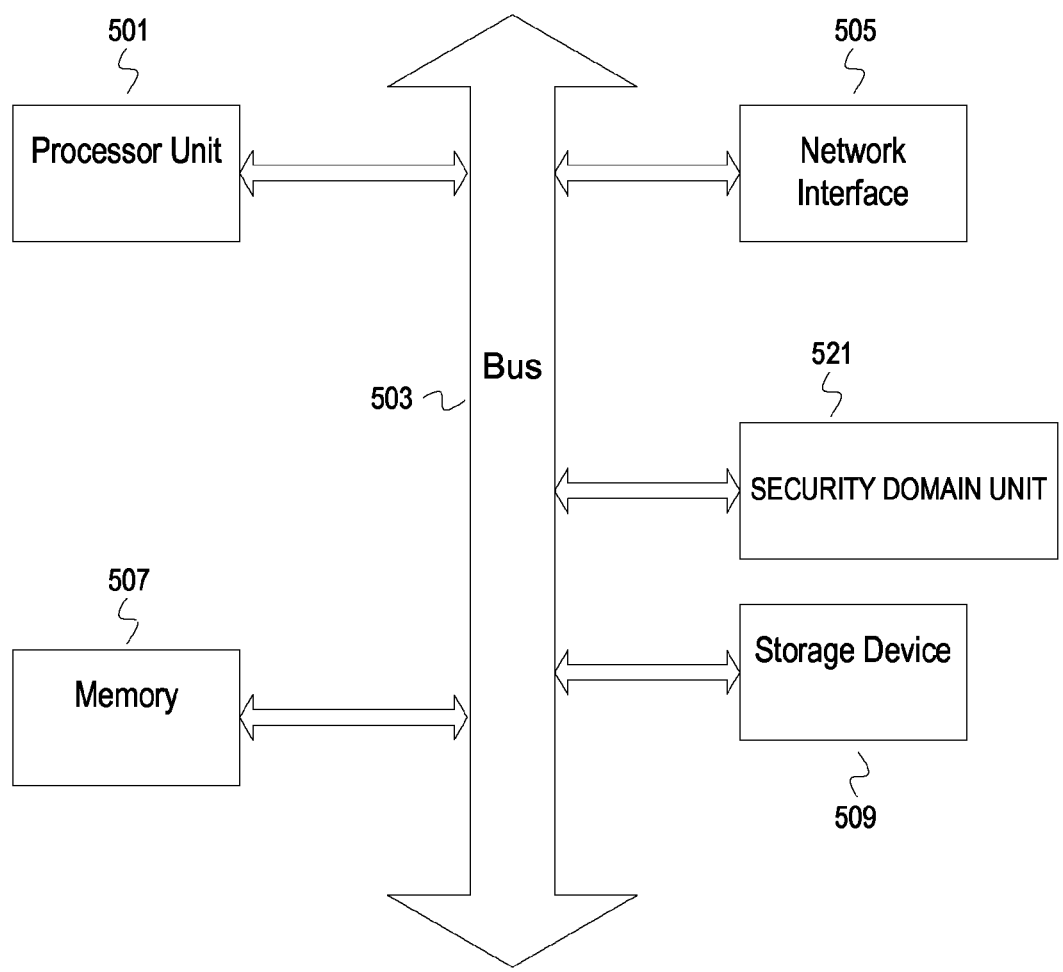
FIG. 5 depicts an example computer system.

FIG. 5 depicts an example computer system. A computer system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, HyperTransport®, InfiniBand®, NuBus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). The computer system also includes a security domain unit 521 that determines security domains associated with a server and applies settings of one of the security domains to the server based on a hierarchy. Any one of these functionalities may be partially (or entirely) implemented in hardware and/or on the processing unit 501. For example, the functionality may be implemented with an application specific integrated circuit, in logic implemented in the processing unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the memory 507 may be coupled to the processor unit 501.

While the embodiments are described with reference to various implementations and exploitations, it will be understood that these embodiments are illustrative and that the scope of the inventive subject matter is not limited to them. In general, techniques for associating multiple security domains to application servers as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer implemented method comprising:
   traversing a representation of a hierarchy of security domains until locating a first element of the representation that indicates a code resource, wherein the code resource comprises program code that is deployed on an application server;
   determining that the first element is associated with a scope of a first of the security domains that encompasses a group of code resources that include the code resource, wherein the first element represents the first security domain;
   determining a security configuration associated with the first element of the representation;
   applying the security configuration to the code resource;
   determining that the security configuration does not indicate a first security setting that should be applied to the code resource;
   traversing the representation of the hierarchy of security domain until location a second element of the representation that indicates the code resource;
   determining that the second element is associated with a second scope of a second of the security domains, wherein the second scope encompasses a second group of code resources that includes the code resource;
   determining a second security configuration that indicates the first security setting is associated with the second element of the representation, wherein the second security configuration is associated with the second element; and
   applying the first security setting to the code resource.

2. The computer implemented method of claim 1, wherein the first element comprises a security domain map.

3. The computer implemented method of claim 1, wherein the scope comprises one of individual application servers, groups of application servers, individual applications, groups of applications, individual clusters, groups of clusters, service integration buses, nodes, and groups of nodes.

4. A computer implemented method comprising:
   traversing a representation of a hierarchy of security domains until locating a first element of the representation that indicates a code resource, wherein the code resource comprises program code that is deployed on an application server;
   determining that the first element is associated with a scope of a first of the security domains that encompasses a group of code resources that include the code resource, wherein the first element represents the first security domain;
   determining a security configuration associated with the first element of the representation;
   applying the security configuration to the code resource;
   detecting installation of a second code resource on the application server;
   determining security attributes of the second code resource, wherein the security attributes indicate values to be applied to security settings for the second code resource;
   traversing the representation of the hierarchy of security domains until locating a plurality of elements of the representation with respective scopes that encompass the application server;
   determining a plurality of security configurations associated with the plurality of elements;
   determining that a second security configuration should be created because the security attributes of the second code resource are not met by security settings indicated by any of the plurality of security configurations;
   creating the second security configuration to satisfy the security attributes of the second code resource;
   creating a second element of the hierarchy;
   associating the second element with the second security configuration;
   defining a second scope to encompass a second group of codes resources that includes the second code resource; and
   associating the second scope with the second element.

5. The computer implemented method of claim 4, wherein determining that the second security configuration should be created because the security attributes are not met by security settings indicated by any of the plurality of security configurations comprises comparing the security attributes with security settings indicated by the plurality of security configurations.

6. A computer program product for associating multiple security domains with an application server, the computer program product comprising:
   a non-transitory computer usable storage medium having computer usable program code embodied therewith, the computer usable program code comprising:
   computer usable program code configured to,
      traverse a representation of a hierarchy of security domains until locating a first element of the representation that indicates a code resource, wherein the code resource comprises program code that is deployed on an application server;
      determine that the first element is associated with a scope of a first of the security domains that encompasses a group of code resources that include the code resource, wherein the first element represents the first security domain;
      determine a security configuration associated with the first element of the representation;
      apply the security configuration to the code resource;
      determine that the security configuration does not indicate a first security setting that should be applied to the code resource;
      traverse the representation of the hierarchy of security domains until locating a second element of the representation that indicates the code resource;

determine that the second element is associated with a second scope of a second of the security domains, wherein the second scope encompasses a second group of code resources that includes the code resource;

determine a second security configuration that indicates the first security setting is associated with the second element of the representation, wherein the second security configuration is associated with the second element; and apply the first security setting to the code resource.

7. The computer program product of claim 6, wherein the scope comprises one of individual application servers, groups of application servers, individual applications, groups of applications, individual clusters, groups of clusters, service integration buses, nodes, and groups of nodes.

8. A computer program product for associating multiple security domains with an application server, the computer program product comprising:

a non-transitory computer usable storage medium having computer usable program code emobodied therewith, the computer usable program code comprising computer usable program code configured to, traverse a representation of a hierarchy of security domains until locating a first element of the representation that indicates a code resource, wherein the code resource comprises program code that is deployed on an application server;

determine that the first element is associated with a scope of a first of the security domains that encompasses a group of code resources that include the code resource, wherein the first element represents the first security domain;

determine a security configuration associated with the first element of the representation;

apply the security configuration to the code resource;

detect installation of a second code resource on the application server;

determine security attributes of the second code resource, wherein the security attributes indicate values to be applied to security settings for the second code resource;

traverse the representation of the hierarchy of security domains until locating a plurality of elements of the representation with respective scopes that encompass the application server;

determine a plurality of security configurations associated with the plurality of elements;

determine that a second security configuration should be created because the security attributes of the second code resource are not met by security settings indicated by any of the plurality of security configurations;

create the second security configuration to satisfy the security attributes of the second code resource;

create a second element of the hierarchy;

associate the second element with the second security configuration;

define a second scope to encompass a second group of codes resources that includes the second code resource; and associate the second scope with the second element.

9. The computer program product of claim 8, wherein the computer useable program code being configured to determine that the second security configuration should be created because the security attributes are not met by security settings indicated by any of the plurality of security configurations comprises the computer useable program code being configured to compare the security attributes with security settings indicated by the plurality of security configurations.

10. A computer program product for associating multiple security domains with an application server, the computer program product comprising:

a non-transitory computer usable storage medium having computer usable program code embodied therewith, the computer usable program code comprising:

computer usable program code configured to, detect installation of an application on an application server;

determine security attributes of the application, wherein the attributes indicate values to be applied to security settings;

determine a plurality of security domains associated with the application server;

determine that the security attributes are not met by security configurations associated with the plurality of security domains;

create a first security domain based on the security attributes;

create a security domain map, wherein the security domain map is associated with the first security domain;

associate the application with the new security domain in the security domain map;

determine that a first security configuration associated with a first of the plurality of security domains would be applied to the application server because the first of the plurality of security domains takes precedence over the first security domain; and dissociate the application server from the first of the plurality of security domains.

11. The computer program product of claim 10, wherein said determine that the security attributes are not met by security configurations associated with the plurality of security domains comprises comparing the security attributes with security settings indicated by the security configurations associated with the plurality of security domains.

12. The computer program product of claim 10, wherein the computer useable program code being configured to dissociate the application server from the first of the plurality of security domains comprises the computer useable program code being configured to remove an indication of the application server from a second security domain map associated with the first of the plurality of security domains.

13. An apparatus comprising:

one or more processing units;

a network interface; and a computer usable storage medium having computer usable program code that embodies a security domain unit operable to, traverse a representation of a hierarchy of security domains until locating a first element of the representation that indicates a code resource, wherein the code resource comprises program code that is deployed on an application server;

determine that the first element is associated with a scope of a first of the security domains that encompasses a group of code resources that include the code resource, wherein the first element represents the first security domain;

determine a security configuration associated with the first element of the representation;

apply the security configuration to the code resource;

determine that the security configuration does not indicate a first security setting that should be applied to the code resource;

traverse the representation of the hierarchy of security domains until locating a second element of the representation that indicates the code resource;

determine that the second element is associated with a second scope of a second of the security domains, wherein the second scope encompasses a second group of code resources that includes the code resource;

determine a second security configuration that indicates the first security setting is associated with the second element of the representation, wherein the second security configuration is associated with the second element; and apply the first security setting to the code resource.

14. The apparatus of claim 13, wherein the first element comprises a security domain map.

15. The apparatus of claim 13, wherein the scope comprises one of individual application servers, groups of application servers, individual applications, groups of applications, individual clusters, groups of clusters, service integration buses, nodes, and groups of nodes.

16. An apparatus comprising:
one or more processing units;
a network interface; and
a computer usable storage medium having computer usable program code that embodies a security domain unit operable to,
traverse a representation of a hierarchy of security domains until locating a first element of the representation that indicates a code resource, wherein the code resource comprises program code that is deployed on an application server;
determine that the first element is associated with a scope of a first of the security domains that encompasses a group of code resources that include the code resource, wherein the first element represents the first security domain;
determine a security configuration associated with the first element of the representation;
apply the security configuration to the code resource;
detect installation of a second code resource on the application server;
determine security attributes of the second code resource, wherein the security attributes indicate values to be applied to security settings for the second code resource;
traverse the representation of the hierarchy of security domains until locating a plurality of elements of the representation with respective scopes that encompass the application server;
determine a plurality of security configurations associated with the plurality of elements;
determine that a second security configuration should be created because the security attributes of the second code resource are not met by security settings indicated by any of the plurality of security configurations;
create the second security configuration to satisfy the security attributes of the second code resource;
create a second element of the hierarchy;
associate the second element with the second security configuration;
define a second scope to encompass a second group of codes resources that includes the second code resource; and
associate the second scope with the second element.

17. The apparatus of claim 16, wherein the security domain unit being operable to determine that the second security configuration should be created because the security attributes are not met by security settings indicated by any of the plurality of security configurations comprises the security domain unit being operable to compare the security attributes with security settings indicated by the plurality of security configurations.

* * * * *